D. Fasig,
Hay Knife.
No. 87,035.       Patented Feb. 16, 1869.
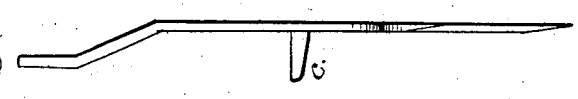
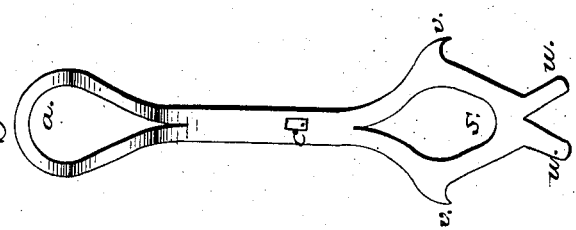
WITNESSES:
James P. Gowie
[signature]
INVENTOR:
Daniel Fasig
per
Chipman Hosmer &Co.
attorneys

DANIEL FASIG, OF ROWSBURG, OHIO.

*Letters Patent No. 87,035, dated February 16, 1869.*

IMPROVEMENT IN HAY-KNIFE AND PRUNER, COMBINED.

The Schedule referred to in these Letters Patent and making part of the same.

*To all whom it may concern:*

Be it known that I, DANIEL FASIG, of Rowsburg, in the county of Ashland, and State of Ohio, have invented a new and valuable Improvement in Hay-Knife and Pruner, Combined; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a front view of my hay and pruning-knife, and Figure 2 is a side view thereof.

My invention relates to knives for cutting hay in the stack or mow; and

It consists in constructing a knife that can be operated both by the hand and foot at the same time, and which is also susceptible of being used as a pruning-knife in horticulture.

My knife is constructed in the form shown on the drawings, in which the letter *a* represents the handle, and the letter *c*, the foot-rest.

The letter *s* represents the lower end of the knife, formed with prongs or forks marked *u*, and also with projecting ears, marked *v*. These forks and ears are made with sharp edges of steel, as are also the sides of the knife between said forks and ears.

To operate my device for cutting hay, I take hold of the handle with one or both hands, and place a foot upon the foot-rest *c*. I now press down upon the hay with such force as may be necessary, and the knife enters the hay with ease upon the angle I desire to cut.

For pruning trees, the operator uses the knife, by forcing the crotch formed by the forks *u* against the limb designed to be cut, or he uses the edge between the prongs and the ears, or the ears themselves, as the case may be.

What I claim as my invention, and desire to secure by Letters Patent, is—

A combined hay and pruning-knife, having handle *a*, foot-rest *c*, prongs *u*, and ears *v*, constructed and operating substantially as herein specified.

In testimony that I claim the above, I have hereunto subscribed my name, in the presence of two witnesses.

DANIEL FASIG.

Witnesses:
A. A. HAMILTON,
J. P. VAN NEST.